United States Patent [19]

Morris et al.

[11] Patent Number: 4,976,104
[45] Date of Patent: Dec. 11, 1990

[54] COMBINED SWITCH AND VALVE FOR COMPRESSOR POWERED INFLATABLE

[75] Inventors: John M. Morris, Auburn; Roger St. John, Seattle, both of Wash.

[73] Assignee: GT Development Corporation, Seattle, Wash.

[21] Appl. No.: 288,697

[22] Filed: Dec. 22, 1988

[51] Int. Cl.⁵ ............................................... A47C 3/30
[52] U.S. Cl. .................................... 60/412; 60/433; 200/61.86; 137/554; 137/625.25; 297/345; 297/DIG. 8; 248/161; 248/631
[58] Field of Search ............... 60/412, 433; 200/61.86, 200/16 B; 248/157, 161; 297/345, DIG. 8; 137/554, 625.25

[56] References Cited

U.S. PATENT DOCUMENTS

| | | | |
|---|---|---|---|
| 2,620,630 | 12/1952 | Bitzer | 200/61.86 X |
| 3,604,454 | 9/1971 | Tomko et al. | 200/61.86 X |
| 3,700,002 | 10/1972 | Christie | 200/61.86 X |
| 3,942,555 | 3/1976 | Raab et al. | 200/61.86 X |
| 3,951,373 | 4/1976 | Swenson et al. | 248/157 X |
| 3,954,245 | 5/1976 | Costin | 248/157 X |
| 4,054,761 | 10/1977 | Raab et al. | 200/61.86 X |
| 4,126,153 | 11/1978 | Raab | 200/61.86 X |
| 4,164,121 | 8/1979 | Houseman et al. | 200/61.86 X |
| 4,524,951 | 6/1985 | Green et al. | 251/327 |

Primary Examiner—Edward K. Look
Assistant Examiner—George Kapsalas
Attorney, Agent, or Firm—Delbert J. Barnard

[57] ABSTRACT

A housing (50, 52) defines a slide chamber (54) in which a slide member (34) reciprocates between three positions. A coil spring (86) holds the slide member (34) into a center position. In this position, slide member (34) blocks fluid flow through a port (28) and positions an electrical conductor (96) away from electrical contacts (110, 112). A push on the slide member (34) moves the electrical conductor (38) into circuit making contact with the contacts (110, 112). A pull on slide member (34) moves an exhaust passageway (36) in the slide member (34) into communication with the fluid port (28). The switch function activates a compressor which pumps air into an inflatable seat actuator. The valve function exhausts air from the inflatable seat actuator.

15 Claims, 3 Drawing Sheets

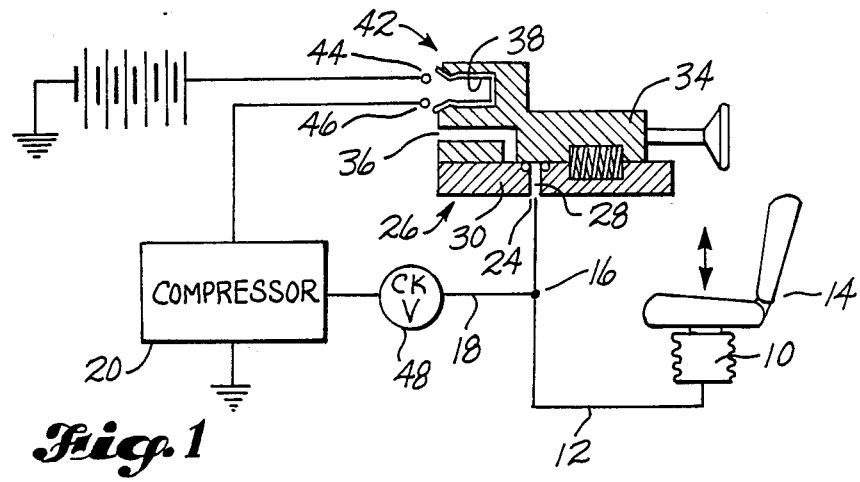
*Fig.*1
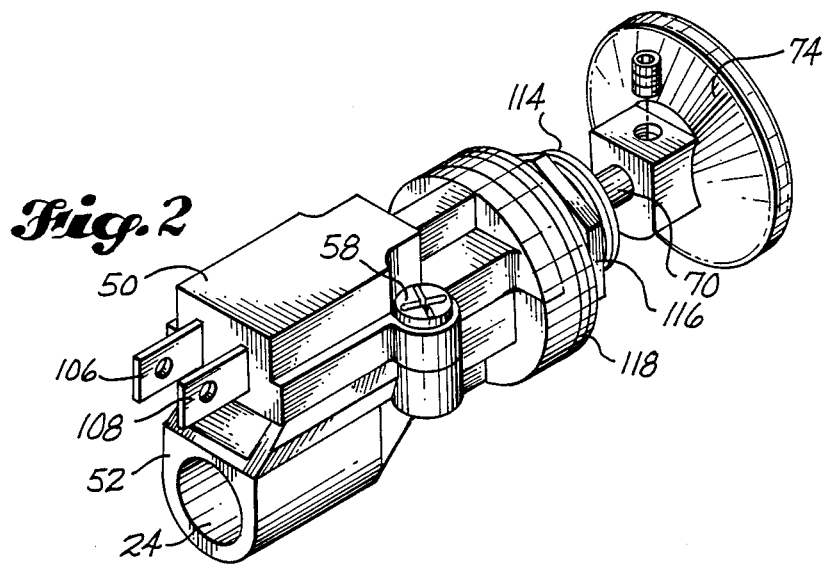
*Fig.*2
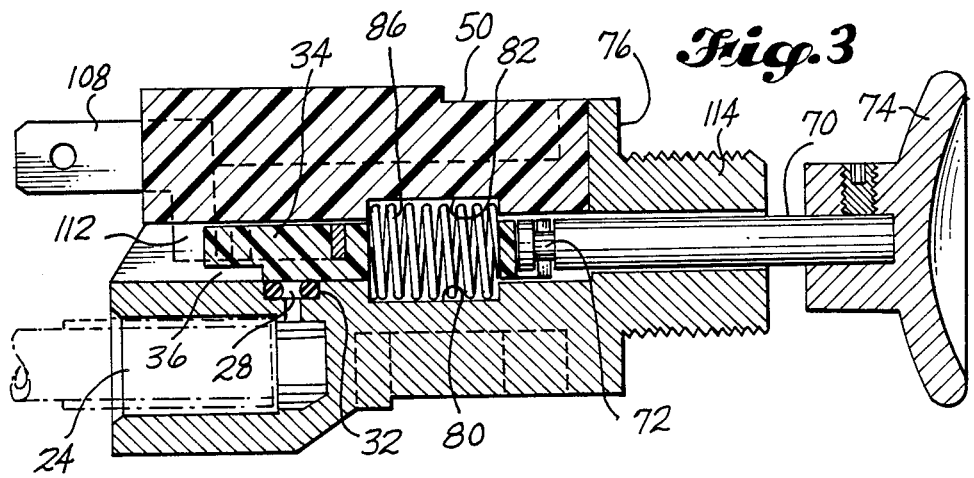
*Fig.*3

COMBINED SWITCH AND VALVE FOR COMPRESSOR POWERED INFLATABLE

BACKGROUND OF THE INVENTION

1. Field of the Invention

This invention relates to a combined switch and valve and to utilization systems. More particularly, it relates to a combination switch and valve having a control member which is moved in a first direction to close a switch and in a second direction to open a valve, and to a system in which the switch controls an air compressor for delivering compressed air into an inflatable and the valve controls exhausting of air out from the inflatable.

2. Description of the Prior Art

It is common practice to raise and lower vehicle seats by use of an air bag which functions like an air cylinder. Air is introduced into the air bag to raise the seat and is exhausted out from the air bag to lower the seat. A known type of control valve for a seat raising-lowering system is disclosed by U.S. Pat. No. 4,524,951, granted June 25, 1985 to Charles J. Green and Alan K. Forsythe. The valve includes a control member which is pushed to allow compressed air flow into the air bag and pulled to cause an exhausting of air flow out from the air bag. The valve is used aboard a vehicle which includes a compressed air system.

There is a need for raising and lowering seats in vehicles which do not include a compressed air system. An object of the present invention is to provide a seat raising-lowering system in which compressed air is furnished by a small electrically powered compressor. An aspect of the present invention is to provide a combined switch and control valve which includes desirable characteristics of the valve disclosed by the aforementioned U.S. Pat. No. 4,524,951.

SUMMARY OF THE INVENTION

The present invention includes the provision of a combination valve and switch which is basically characterized by a three position slide member. The slide member is located within a slide chamber formed in a housing. The slide chamber is bounded by spaced apart first and second fluid ports. The slide member includes a passageway which communicates the two ports when the slide member is in a first position. The slide member blocks flow between the two ports when the slide member is in its second and third positions. A pair of spaced apart electrical switch contacts are carried by the housing. A circuit making conductor is carried by the slide member and is positioned to engage both of the switch contacts when the slide member is in its third position. The conductor is in a circuit breaking spaced relationship from the contacts when the slide member is in its first and second switch positions. The second position of the slide member is a neutral position in which the valve is closed and the switch is open. Movement of the slide member from the second position to the first position opens the valve with the switch remaining open. Movement of the slide member from the second position to the third position closes the switch with the valve remaining closed.

Other more detailed aspects of the combination valve and switch and utilization systems are hereinafter described in detail of the best mode.

BRIEF DESCRIPTION OF THE DRAWINGS

In the drawing, like reference numerals are used to designate like parts throughout the several views, and:

FIG. 1 is a schematic diagram of a vehicle seat raising and lowering system embodying the present invention;

FIG. 2 is a pictorial view of a preferred embodiment of the combination valve and switch;

FIG. 3 is a longitudinal sectional view of the preferred embodiment of the combined valve and switch, showing the slide member in a neutral position;

DETAILED DESCRIPTION OF THE PREFERRED EMBODIMENTS

Figure 4:
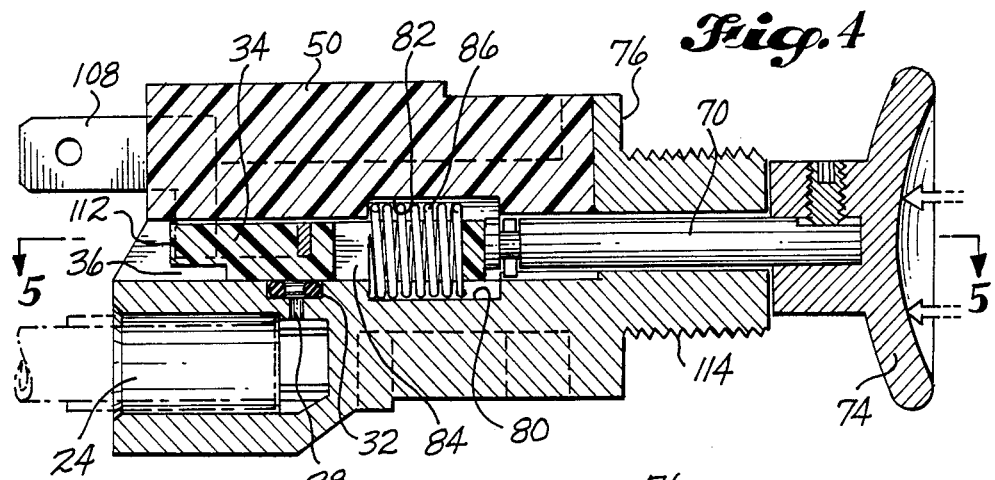
FIG. 4 is a view like FIG. 3 but showing the slide member pushed to close the switch.

The system shown by FIG. 1 comprises an inflatable 10 having a combined inlet-outlet passageway 12. The inflatable 10 may be an air bag which functions like an air cylinder for raising or lowering a vehicle seat 14. The combined inlet-outlet passageway 12 is connected by a tee 16 to a conduit 18 leading from an air compressor 20 and an exhaust conduit 22 leading to an inlet 24 of an exhaust valve 26. The exhaust valve 26 includes a port 28 in a housing region 30 surrounded by an O-ring seal 32. A control member 34, which may be a push-pull slide member, has a face which contacts the O-ring seal 32. Member 34 also includes an exhaust passageway 36 and an electrical conductor 38. The compressor 20 may be a 12 volt compressor similar to the compressors used to inflate spare tires. The compressor 20 includes an electrical control circuit 40 of which an on-off switch 42 is a part. Switch 42 includes spaced apart, normally open switch terminals 44, 46.

In the disclosed embodiment, a push (FIGS. 4 and 5) on the member 34 will move the conductor 38 into a circuit making contact with the terminals 44, 46. A pull (FIG. 6) on the member 34 will bring the exhaust passageway 36 into communication with the exhaust port 28. In FIGS. 1 and 3, slide member 34 is in a neutral position. In this position, the exhaust port 28 is blocked, i.e., the valve 26 is closed. Also, the conductor 38 is spaced from the terminals 44, 46, i.e., the switch 42 is open. As previously stated, a push on the member 34 will close the switch 42, to activate the compressor 20. When this happens, the exhaust port 28 remains blocked by the member 34. A pull on the member 34 will move exhaust passageway 36 into communication with exhaust port 28, allowing the air in inflatable 10 to flow successively through conduit 12, conduit 22, exhaust port 28 and exhaust passageway 36, to the atmosphere. While this is happening, the conductor 38 is spaced from the terminals 42, 44 and the compressor 20 is off. A one-way check valve 48 in conduit 18 prevents reverse flow through the compressor 20. When member 34 is in its neutral position, the member 34 blocks flow through conduit 22 to the atmosphere.

Figure 5:
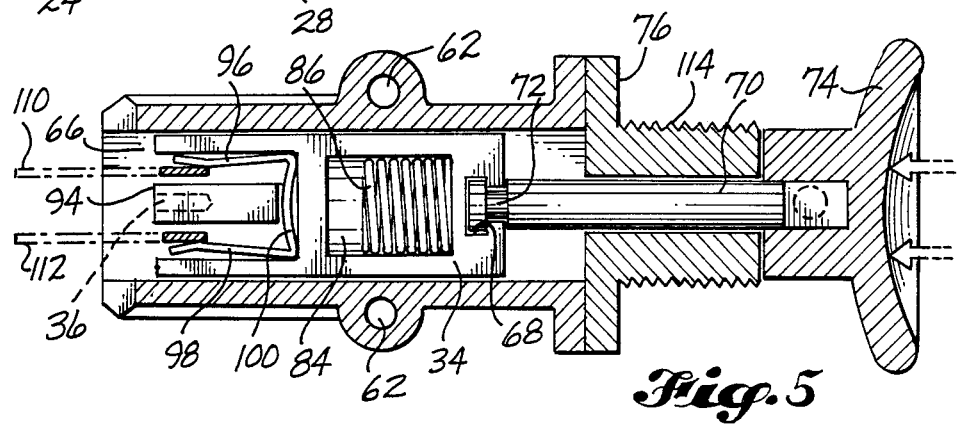
FIG. 5 is a longitudinal sectional view taken substantially along lines 5—5 of FIG. 4.
Figure 6:
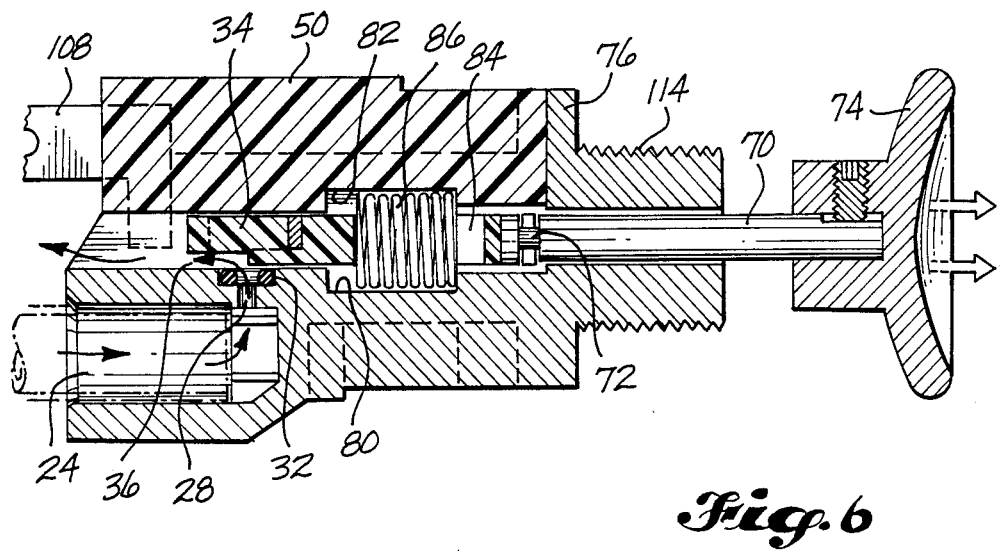
FIG. 6 is a view like FIGS. 3 and 4, but showing the slide member pulled to open the exhaust valve.
Figure 7:
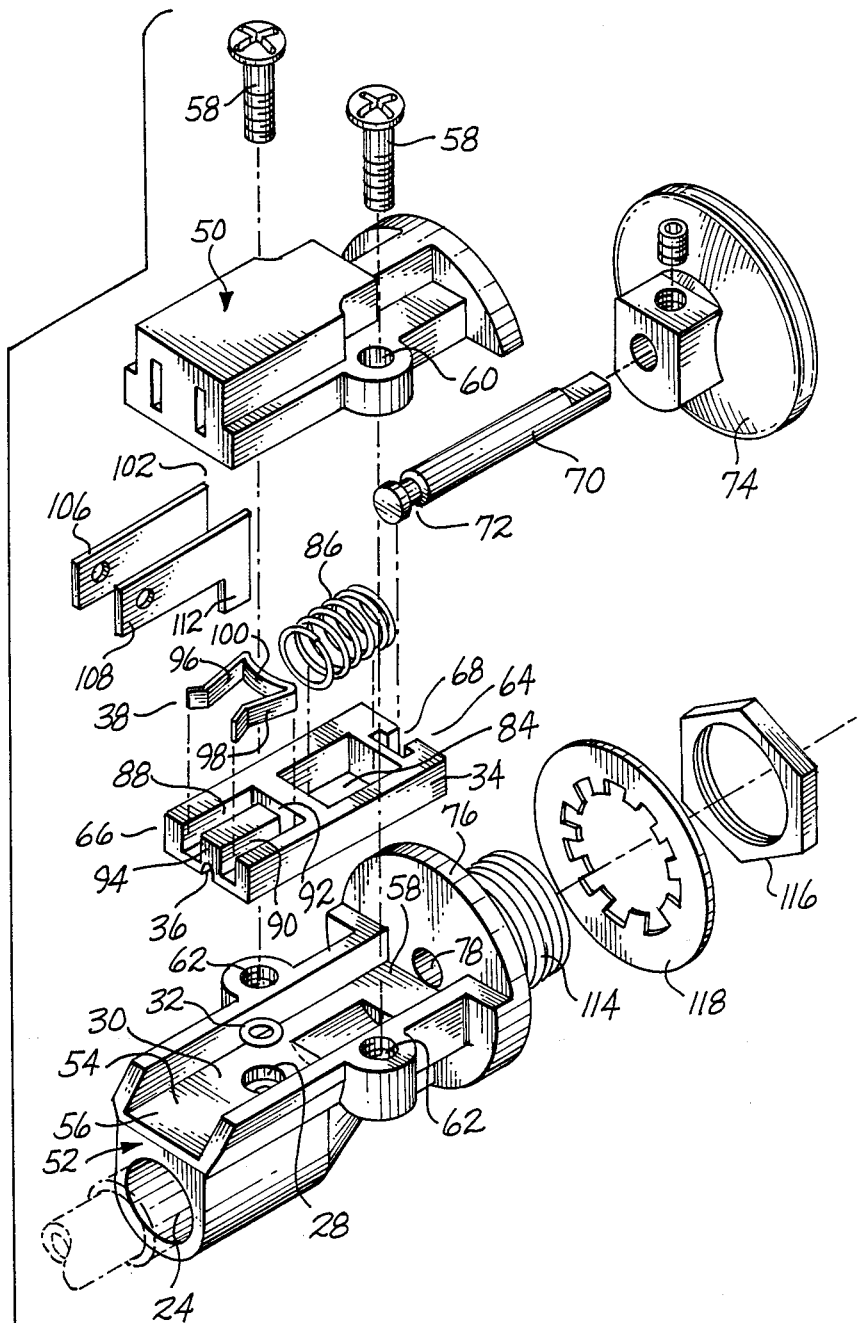
FIG. 7 is an exploded pictorial view of the preferred embodiment of the combination valve and switch.

FIGS. 2–7 show a combination valve-switch 26, 42 that is constructed according to the invention and which constitutes the best mode of the invention. As best shown by FIG. 7, the combination valve/switch unit 26, 42 comprises a two-part housing 50, 52. Housing part 52 is formed to include a longitudinal channel 54 which is open at one end 56 and closed at the opposite end 58. Housing part 50 closes the open side of the channel 54. The housing parts 50, 52 may be held together by a pair of screw fasteners 58 which extend through openings 60 in the housing part 50 and thread into threaded openings 62 in the housing part 52. Housing region 30 is a base portion of the channel 54. Port 28 is surrounded by a groove and the O-ring seal 32 fits in the groove, and presents a face directed toward the member 34.

In the illustrated embodiment, the member 34 is a slide member having an inner end 64 and an outer end 66. Slide member 34 has a rectangular cross-sectional shape substantially matching the cross-section shape of the slideway. A tee slot 68 is formed in slide member 34 adjacent the inner end 64. A control rod 70 is provided which includes an inner end 72 shaped to fit into the tee slot 62. The opposite end of the rod 70 is connected to a control knob 74. Housing part 52 includes an end portion 76 which is provided with an axial opening 78 through which the rod 70 extends. The base of the channel 54 includes a spring entrapping recess 80 located between the port 28 and end wall 58. A substantially identical recess 82 is formed in housing part 50. Slide member 34 includes a conductor carrying portion at its outer end and a spring receiving opening 84 between the conductor carrying portion and the inner end 64. As best shown by FIG. 5, a coil spring 86 is snugly fittable into the opening 84. The opening 84 is slightly wider than the diameter of the spring 86. The slide member 34 has a thickness dimension less than the diameter of spring 86. As a result, when spring 86 is within opening 84, the opposite side portions of spring 86 project outwardly beyond the opposite side surfaces of slide member 34. The projecting side portions of the spring 86 are received within the recesses 80, 82. Lengthwise the spring 86 is snugly received within opening 84 and recesses 80, 82.

The conductor carrying portion of slide member 34 comprises a pair of parallel recesses 88, 90. The recesses 88, 90 extend longitudinally of slide member 34 and are interconnected at their inner end by a transverse passageway 92. A divider 94 exists between channels 88, 90 and the exhaust passageway 36 is located in the divider 94. The conductor 38 is a U-shaped member comprising a pair of side arms 96, 98 and a connecting portion 100. The connecting portion 100 fits down into the passageway 92 and the arms 96, 98 into the channels 88, 90. The arms 96, 98 include free ends which extend toward the end 66 of slide member 34.

Housing part 50 includes a pair of spaced apart terminals 102, 104. Housing part 50 is constructed from plastic and the terminals 102, 104 are molded into it. Terminals 102, 104 include attachment portions 106, 108 which project endwise outwardly from housing part 50. They also include contacts 110, 112 which project from housing part 50 toward housing part 52, within an outer end region of the channel 54.

The combination valve and switch that has been described is assembled in the following manner. The control knob 74 is attached to the outer end of rod 70. The inner end of rod 70 is then inserted through opening 78, to place the end portion 72 within the inner end portion of the channel 52. The O-ring seal 32 is positioned within the channel surrounding the port 28. Then, the slide member 34 is moved downwardly into the channel 54 with the tee opening 68 in register with rod end portions 72 so that rod end portions 72 will move relatively into the tee opening 68. Conductor 38 is positioned within the channels 88, 90 and passageway 92. Spring 86 is then inserted into opening 84 and pushed down to place its lower projecting side portion into recess 80. Next, housing part 50 is positioned with its opening 60 aligned with the opening 62 in housing part 52. This also positions the upper side part of spring 86 into recess 82. Then, the screw fasteners 58 are inserted through the opening 60 and threaded into the opening 62.

End portion 76 of housing part 52 may include a threaded neck 114 which extends through an opening in a mounting board. A mounting nut 16 threads onto the neck 114, to secure it to the mounting board. A washer 118 may be provided between the nut 116 and an end surface of housing part 52 at the base of the threaded neck 114.

The combination valve and switch of this invention has substantial similarity to the valve disclosed by the aforementioned U.S. Pat. No. 4,524,951. However, the differences are significant. Slide member 34 does not include a second fluid passageway and housing part 50 does not include a supply port, an O-ring seal surrounding the supply port, or an inlet for delivering compressed air to the supply port. Rather, housing part 50 is constructed from a plastic material and carries the switch terminals 106, 108. Slide member 34 includes a single fluid passageway and carries the conductor 38.

FIGS. 1 and 3 show the slide member 34 in its neutral position. It is normally biased in that position by the spring 68 and the entrapment of the opposite side portions of the spring 68 within the recesses 80, 82. As best shown by FIG. 3, when slide member 34 is in a neutral position, the port 28 is blocked by a portion of the slide member 34. As best shown by FIG. 5, when slide member 34 is in its neutral position, the arms 96, 98 of the conductor 38 are spaced from the contacts 110, 112. When knob 74 is pushed upon, the spring 86 is compressed and slide member 34 moves endwise and in the process, the outer end portions of the conductor arms 66, 68 are moved into engagement with the contacts 110, 112. Upon such engagement, the conductor 38 makes a conductive path between the contacts 110, 122 and thus closes the switch. As also best shown by FIG. 3, the port 28 remains blocked throughout the movement of slide member 34 caused by a push on the knob 74. As best shown by FIG. 3, a pull on the knob 74 will compress spring 86 in the opposite direction, attended by movement of slide member 34. This movement places passageway 36 into registry with port 28, allowing air to flow through port 28, then through passageway 36 and finally through port 120 to the atmosphere. Ports 28 and 120 both bound the slideway 34.

The specific embodiments of both the system and combination valve and switch which have been illustrated and described are submitted as examples of the invention. Coverage is not to be limited by the details of these examples, but rather, the scope of protection is to be determined by the appended claims interpreted in accordance with the established rules of patent claim interpretation, including use of the doctrine of equivalents.

We claim:
1. An inflation/deflation system, comprising:
an inflatable including a combination inlet-outlet;
an electric air compressor including an outlet;
a combination valve and switch;

an electrical control circuit for the compressor including said switch;
an air exhaust system for said inflatable including said valve and an exhaust passageway leading from said inflatable in which said valve is located;
wherein said combination valve and switch includes a single control member movable to close the switch and make the compressor functional for delivering compressed air to the inflatable, and also movable for opening the valve to exhaust air from the inflatable;
wherein the inflatable is an air bag within a vehicle seat; and
wherein the combination valve and switch further comprises:
a housing including a slide chamber, a first fluid port bounding the slide chamber, a second fluid port spaced from the first port and also bounding the slide chamber;
a three position slide member in said slide chamber, said slide member including a passageway which communicates the two ports when the slide member is in a first of said positions and a portion which blocks flow between the two ports when the slide member is in the second and third of said positions;
a pair of spaced apart electrical switch contacts carried by said housing;
a circuit making conductor carried by the slide member and positioned to engage both of the switch contacts when the slide member is in its third position, said conductor being in a circuit breaking spaced relationship from these contacts when the slide member is in its first and second switch position;
wherein the second position of the slide member is a neutral position in which the valve is closed and the switch is opened;
wherein movement of the slide member from the second position to the first position opens the valve with the switch remaining open;
wherein movement of the slide member from the second position to the third position closes the switch with the valve remaining closed; and
an inlet passageway in said housing leading to the first fluid port; and
said system including a conduit connecting said inlet passageway to the inlet-outlet of said inflatable; and
wherein said second fluid port of said valve is disposed to discharge to atmosphere.

2. A combination valve and switch, comprising:
a housing including a slide chamber, a first fluid port bounding the slide chamber, a second fluid port spaced from the first port and also bounding the slide chamber;
a three position slide member in said slide chamber, said slide member including a passageway which communicates the two ports when the slide member is in a first of said positions and a portion which blocks flow between the two ports when the slide member is in the second and third of said positions;
a pair of spaced apart electrical switch contacts carried by said housing;
a circuit making conductor carried by the slide member and positioned to engage both of the switch contacts when the slide member is in its third position, said conductor being in a circuit breaking spaced relationship from these contacts when the slide member is in its first and second switch positions;
wherein the second position of the slide member is a neutral position in which the valve is closed and the switch is open;
wherein movement of the slide member from the second position to the first position opens the valve with the switch remaining open; and
wherein movement of the slide member from the second position to the third position closes the switch with the valve remaining closed.

3. A combination valve and switch according to claim 2, wherein said slide member includes a first end and a push-pull control member connected to said first end, said control member being movable in one direction to move the slide member from its neutral second position to its first position and being movable in the opposite direction to move the slide member from its neutral second position to the third position, said slide member having an opposite second end which carries the said circuit making conductor.

4. A combination valve and switch according to claim 3, wherein the second end of the slide member includes a pair of laterally spaced apart longitudinal cavities and a divider wall between the cavities, said cavities having inner ends and open outer ends, and a lateral passageway interconnecting the inner ends of the cavities, and wherein said circuit making conductor is a substantially U-shaped member having a pair of arms and an interconnecting base, said base being situated in said lateral passageway and said arms being situated in said cavities, and with said arms having end portions projecting towards the open outer ends of the cavities, and wherein the spaced apart electrical contacts are positioned in alignment with the open ends of said cavities and when the slide member is in its first and second positions are spaced from the arms of the conductor but make contact with the arms of the conductor when the slide member is in its third position.

5. A combination valve and switch according to claim 4, wherein the passageway in the slide member extends through the divider wall between the cavities.

6. A combination valve and switch according to claim 2, wherein said housing comprises first and second separable parts, wherein said switch contacts are carried by the first part and the first fluid port is formed in said second housing part, and said second housing part includes an inlet passageway in communication with said first fluid port.

7. A combination valve and switch according to claim 6, wherein the slide chamber is defined by and between the two housing parts and the second fluid port is an open end of the slide chamber.

8. A combination valve and switch according to claim 7, wherein the second housing part includes a longitudinal channel in which the slide member is at least partially received and the first housing part provides a closure for the channel and said channel and said closure at least partially define the slide chamber.

9. A combination valve and switch according to claim 7, wherein said slide member includes a first end and a push-pull control member connected to said first end, said control member being movable in one direction to move the slide member from its neutral second position to its first position and being movable in the opposite direction to move the slide member from its neutral second position to the third position, said slide member having an opposite end which carries the said circuit making conductor.

10. A combination valve and switch according to claim 9, wherein said slide member includes a centering spring cavity between its first and second ends, and a coil centering spring within said cavity having opposite side portions projecting outwardly from the opposite sides of the slide member, and said first and second housing parts including cavities sized to snugly receive the projecting side portions of the spring.

11. A combination valve and switch according to claim 9, wherein the second end of the slide member includes a pair of laterally spaced apart longitudinal cavities and a divider wall between the cavities, said cavities having inner ends and open outer ends, in a lateral passageway interconnecting the inner ends of the cavities, and wherein said circuit making conductor is a substantially U-shaped member having a pair of arms and an interconnecting base, said base being situated in said lateral passageway and said arms being situated in said cavities, and with said arms having end portions projecting towards the open outer ends of the cavities, and wherein the spaced apart electrical contacts are positioned in alignment with the open ends of said cavities and when the slide member is in its first and second positions are spaced from the arms of the conductor but make contact with the arms of the conductor when the slide member is in its third position.

12. A combination valve and switch according to claim 11, wherein the passageway in the slide member extends through the divider wall between the cavities.

13. An inflation/deflation system, comprising:
an inflatable including a combination inlet-outlet;
a dedicated electric air compressor including an outlet;
a combination valve and switch;
an electrical control circuit for the compressor including a source of electric energy and said switch;
an air exhaust system for said inflatable including said valve and an exhaust passageway leading from said inflatable in which said valve is located; and
wherein said combination valve and switch includes a single control member movable to operate the switch and make the compressor functional for delivering compressed air to the inflatable while the valve is closed, and also movable for operating the switch to disable the compressor and at the same time open the valve to exhaust air from the inflatable.

14. A system according to claim 13, wherein the inflatable is an air bag within a vehicle seat.

15. A system according to claim 13, wherein said combination valve and switch has a neutral position in which the valve is closed and the switch is open and is movable in a first direction from the neutral position to close the switch and a second direction from the neutral position to open the valve, said valve being closed when the switch is open.

* * * * *